US008668385B2

(12) United States Patent
Matsuo et al.

(10) Patent No.: US 8,668,385 B2
(45) Date of Patent: Mar. 11, 2014

(54) TEMPERATURE SENSOR

(75) Inventors: Kouji Matsuo, Kasugai (JP); Satoshi Ishikawa, Kani (JP); Masamichi Ito, Iwakura (JP); Satoshi Mogari, Komaki (JP)

(73) Assignee: NGK Spark Plug Co., Ltd., Aichi (JP)

( * ) Notice: Subject to any disclaimer, the term of this patent is extended or adjusted under 35 U.S.C. 154(b) by 312 days.

(21) Appl. No.: 13/186,881

(22) Filed: Jul. 20, 2011

(65) Prior Publication Data

US 2012/0020385 A1 Jan. 26, 2012

(30) Foreign Application Priority Data

Jul. 20, 2010 (JP) .................................. 2010-162568
Apr. 19, 2011 (JP) .................................. 2011-92582

(51) Int. Cl.
*G01K 1/00* (2006.01)
*G01K 7/00* (2006.01)
*G01K 13/00* (2006.01)

(52) U.S. Cl.
USPC ............................ 374/208; 374/163; 374/148

(58) Field of Classification Search
USPC .......................................... 374/208, 163, 148
See application file for complete search history.

(56) References Cited

U.S. PATENT DOCUMENTS

| 4,453,835 | A * | 6/1984 | Clawson et al. ............... 374/185 |
| 6,130,598 | A * | 10/2000 | Katsuki et al. ................... 338/28 |
| 7,060,949 | B1 * | 6/2006 | Davis et al. ..................... 219/536 |
| 2002/0039378 | A1 * | 4/2002 | Shibayama ................... 374/148 |
| 2002/0135455 | A1 * | 9/2002 | Murata et al. .................... 338/28 |
| 2004/0080394 | A1 * | 4/2004 | Nelson .............................. 338/28 |
| 2004/0101028 | A1 * | 5/2004 | Iwaya et al. ................... 374/163 |
| 2004/0135664 | A1 * | 7/2004 | Hanzawa et al. ................. 338/25 |
| 2005/0265426 | A1 * | 12/2005 | Hanzawa et al. .............. 374/208 |
| 2006/0176931 | A1 * | 8/2006 | Miyahara et al. .............. 374/208 |
| 2007/0104247 | A1 * | 5/2007 | Takahashi ....................... 374/185 |
| 2007/0171959 | A1 * | 7/2007 | Irrgang et al. .................. 374/185 |
| 2007/0195857 | A1 * | 8/2007 | Krishnamurthy et al. ..... 374/148 |
| 2009/0279585 | A1 * | 11/2009 | Morita et al. ................... 374/185 |
| 2009/0279586 | A1 * | 11/2009 | Suzuki et al. ................... 374/185 |
| 2009/0323765 | A1 * | 12/2009 | Yokoi et al. .................... 374/185 |
| 2012/0044972 | A1 * | 2/2012 | Ito et al. ......................... 374/183 |

FOREIGN PATENT DOCUMENTS

| JP | 7-140012 A | 6/1995 |
| JP | 2004-33203 A | 11/2004 |
| JP | 2009300237 A | 12/2009 |

OTHER PUBLICATIONS

Chinese Office Action dated Jun. 27, 2013 for corresponding Chinese Patent Application No. 201110208382.

* cited by examiner

*Primary Examiner* — Mirellys Jagan
(74) *Attorney, Agent, or Firm* — Sughrue Mion, PLLC

(57) ABSTRACT

A sensor (101) is configured such that a seal member (71) is provided in a deformed manner through crimping of a portion of a tube (11) located toward a rear end (17*c*) of the tube (11). The seal member (71) is deformed such that a frontward-oriented surface (75), which is a bottom surface of a recess (74) formed in a front end (73) of the seal member (72), presses a rear end (45) of an insulation sheath (41) frontward. Consequently, a front end (21*a*) of a sensor element is pressed against a front end (12) of the tube (11) via the insulation sheath (41). By virtue of a pressing action induced by rubber-like elasticity, high sensor responsiveness is maintained over a long period of time.

11 Claims, 12 Drawing Sheets

TEMPERATURE SENSOR

BACKGROUND OF THE INVENTION

1. Field of the Invention

The present invention relates to a temperature sensor for measuring the temperature of a fluid, such as exhaust gas from an engine. More particularly, the invention relates to a temperature sensor having a temperature sensor element, such as a thermistor, disposed in a front end portion of a metal tube having a closed front end (a closed-bottomed tube or cap), and which is attached to an exhaust manifold (an exhaust gas pipe) such that the front end of the tube is exposed to exhaust gas, and is favorably adapted to measure the temperature of the exhaust gas.

2. Description of the Related Art

Conventionally, a temperature sensor (hereinafter, also referred to as a sensor) of this type has been proposed as embodying various structures (refer to, for example, Patent Document 1). The temperature sensor disclosed in Patent Document 1 has the following structure: a temperature sensor element (hereinafter, also referred to as a sensor element or an element) coated with glass is disposed at the front end of an insulation sheath formed of an insulative material; electrodes (electrode wires) of the element and the core wires (lead wires) connected to the respective electrodes extending through the insulation sheath; and a tube made of metal and having a closed front end accommodating these components such that the element is disposed in a front end portion of the tube. In the temperature sensor, in order to improve accuracy of measurement by enhancing responsiveness and temperature sensitivity, the front end of the element is in direct contact with the tube which protects the element, thereby enhancing heat transfer to the element. Responsiveness and temperature sensitivity may deteriorate as a result of heat transfer (heat release) through the tube, for example, immediately after cold start of the engine. In fabricating the temperature sensor, cement (heat resistant cement) which serves as a filler is charged into a space between the inner circumferential surface of a portion of the tube located toward the front end of the tube and the outer circumferential surface of a portion of the insulation sheath located toward the front end of the insulation sheath and is then dried and set, thereby fixing the element and the insulation sheath within the tube. In this manner, a state of contact is maintained between the element and the tube.

In the temperature sensor, a seal member (a bushing or a cap) made of rubber is fixed in a rear end portion of the tube for establishing gastightness and liquid-tightness, and lead wires electrically connected to the respective electrode wires extend through the seal member in the front-rear direction and extend outward from the seal member. Further, in the temperature sensor, a mounting metal fitting having external threads formed on its outer circumferential surface is externally fitted to the tube. The mounting metal fitting is threadingly mounted to an exhaust manifold or the like (hereinafter, also referred to as an exhaust manifold), whereby the temperature sensor is put into use.

Meanwhile, in the temperature sensor, as mentioned above, the sensor element and the insulation sheath are only fixed by means of cement charged into a portion of the tube located toward the front end of the tube. Further, only a portion of the insulation sheath located toward the front end of the insulation sheath is fixed, whereas a portion of the insulation sheath located toward the rear end of the insulation sheath is not fixed. Specifically, the lead wires (output lead wires) project from the rear end of the insulation sheath, and the lead wires alone are retained by extending the lead wires through a seal member disposed and fixed in a rear end portion of the tube. The rear end of the insulation sheath is not actively fixed, but is in a state of having a nearly free end.

[Patent Document 1] Japanese Patent Application Laid-Open (kokai) No. H07-140012

3. Problems to be Solved by the Invention

As mentioned above, in the temperature sensor described in Patent Document 1, the insulation sheath having the sensor element disposed at its front end is fixed within the tube only in such manner that a portion of the insulation sheath located toward the front end of the insulation sheath is fixed by means of cement. Thus, upon vibration or impact, the rear end of the insulation sheath is likely to, for example, laterally oscillate about the front end of the insulation sheath. Such lateral oscillation is likely to cause cracking in the cement which fixes the element as well as a portion of the insulation sheath located toward the front end of the insulation sheath contained in a portion of the tube located toward the front end of the tube. Also, as a result of alternating exposure to high temperature and low temperature in the course of actual use, associated thermal variations may cause cracking in the cement. As a result, in some cases, the cement is broken into pieces starting from such cracks. In such a case, a problem of deterioration in responsiveness or temperature sensitivity arises for the following reason: since the cement breaks up and scatters within the tube, the cement loses its function of fixing the element and the insulation sheath, so that the element separates from the front end of the tube or moves rearward.

Also, in some cases, the following problem arises: in using the temperature sensor mounted to the exhaust manifold, vibration or impact imposed on the temperature sensor causes the insulation sheath to oscillate at its rear end. As a result, stress is repeatedly imposed on the core wires projecting from the rear end of the insulation sheath, and associated metal fatigue causes the core wire(s) to break. Particularly, in the case where the cement loses its function of fixing the element and the insulation sheath, the insulation sheath is likely to move. Therefore, the risk of breaking the core wires is high.

SUMMARY OF THE INVENTION

The present invention has been made in view of the above problems of the prior art, and an object thereof is to provide a temperature sensor in which, even upon vibration or impact, a state of contact of an element with the front end of a tube is stably maintained. As a result, the temperature sensor of the invention maintains high responsiveness and temperature sensitivity over a long period of time and prevents the core wire(s) from breaking, and thus exhibits excellent vibration resistance and durability.

The above object of the present invention has been achieved by providing (1) a temperature sensor comprising a metal tube having a closed front end; a temperature sensor element disposed in a front end portion of the tube; an insulation sheath disposed rearward of the temperature sensor element within the tube and core wires connected to respective electrodes of the temperature sensor element, the core wires extending through the insulation sheath; lead wires connected to respective rear ends of the core wires, the core wires extending outward from a rear end of the insulation sheath, and the lead wires extending outward from a rear end of the tube; and an elastic seal member having rubber-like elasticity, the lead wires extending through the seal member, at least a portion of the seal member being disposed within the tube and rearward of the rear end of the insulation sheath for maintaining a seal at a rear end portion of the tube. The seal member is deformed through crimping of the tube. The temperature sensor is characterized in that, through deformation of the seal member, the seal member presses the rear end of the insulation sheath frontward, directly or via another member, by means of a frontward-oriented surface of the seal member, whereby the temperature sensor element is pressed against a front end of the tube via the insulation sheath.

In a preferred embodiment (2), the invention provides a temperature sensor as described in (1) above, wherein the seal member is provided in a rear end portion of the tube or in a portion of the tube located toward the rear end of the tube; and, by means of the rear end portion of the tube or the portion located toward the rear end of the tube being crimped in a radially compressed manner, the seal member is radially compressed, whereby the seal member is deformed such that the frontward-oriented surface is displaced frontward and presses the rear end of the insulation sheath frontward, directly or via another member.

In another preferred embodiment (3), the invention provides a temperature sensor as described in (1) or (2) above, wherein an insulation member is disposed between the temperature sensor element and a front end of the insulation sheath.

In yet another preferred embodiment (4), the invention provides a temperature sensor as described in any one of (1) to (3) above, wherein the front end of the tube has an inner surface having a substantially semispherical concave shape, and the frontward-oriented surface of the temperature sensor element has a substantially semispherical convex shape which fits the substantially semispherical concave shape of the inner surface of the front end of the tube.

In yet another preferred embodiment (5), the invention provides a temperature sensor as described in any one of (1) to (4) above, wherein the inner circumferential surface of a portion of the tube located toward the front end of the tube has a diameter accommodating at least a front end portion of the insulation sheath in a loose fit condition.

In yet another preferred embodiment (6), the invention provides a temperature sensor as described in any one of (1) to (5) above, wherein a filler for fixing the insulation sheath is not present between the inner circumferential surface of a portion of the tube located toward the front end of the tube and the outer circumferential surface of a portion of the insulation sheath located toward the front end of the insulation sheath.

In yet another preferred embodiment (7), the invention provides a temperature sensor as described in any one of (1) to (6) above, wherein the seal member has a recess formed at a front end thereof; the rear end of the insulation sheath is located within the recess; a protrusion protruding frontward is formed on the frontward-oriented surface which is the bottom of the recess, the protrusion pressing the rear end of the insulation sheath frontward at a portion located inside the outer circumferential edge of the rear end of the insulation sheath; and the protrusion pressing the rear end of the insulation sheath frontward directly or via another member.

In yet another preferred embodiment (8), the invention provides a temperature sensor as described in any one of (1) to (6) above, wherein a front end of the seal member is larger (i.e., having a greater surface area) than the rear end of the insulation sheath; the outer circumferential edge of the rear end of the insulation sheath is located inside the outer circumferential edge of the front end of the seal member; a protrusion protruding frontward is formed on the frontward-oriented surface of the seal member, the protrusion pressing the rear end of the insulation sheath frontward at a portion located inside the outer circumferential edge of the rear end of the insulation sheath; and the protrusion presses the rear end of the insulation sheath frontward directly or via another member.

In yet another preferred embodiment (9), the invention provides a temperature sensor as described in (7) or (8) above, wherein the protrusion has a substantially semispherical shape.

In yet another preferred embodiment (10), the invention provides a temperature sensor as described in (7) above, wherein the protrusion has a substantially semispherical shape formed over substantially the entirety of the frontward-oriented surface which is the bottom of the recess.

In yet another preferred embodiment (11), the invention provides a temperature sensor as described in (7) above, wherein the protrusion has a substantially semispherical shape formed over the entirety of the frontward-oriented surface which is the bottom of the recess, and a concavely radiused fillet is formed at a corner located at the bottom of the recess and defined by the surface of the protrusion and the wall surface of the recess along the circumferential direction of the wall surface.

No particular limitation is imposed on the seal member, which is a constituent element of the present invention, so long as it can maintain a seal at a rear end portion of the tube and press the rear end of the insulation sheath frontward with an appropriate elastic force induced by deformation of the seal member itself. In a sensor for measuring the temperature of exhaust gas, preferably, a synthetic rubber having high heat resistance is used to form the seal member. Examples of such a synthetic rubber include silicone rubber and fluororubber. A preferred rubber hardness for the seal member ranges from 60 degrees to 80 degrees.

Effect of the Invention

According to the present invention, through deformation of the elastic seal member having rubber-like elasticity, the seal member presses the rear end of the insulation sheath frontward, directly or via another member, by means of the frontward-oriented surface of the seal member, whereby the temperature sensor element is pressed against the front end of the tube via the insulation sheath. Thus, even when a fixing filler (e.g., heat-resistant cement; hereinafter, also referred to as cement) is charged between the inner circumferential surface of a portion of the tube located toward the front end of the tube and each of the element and the outer circumferential surface of a portion of the insulation sheath located toward the front end of the insulating sheath, and the cement is broken into pieces and scatters when vibrated in the course of use of the sensor, according to the present invention, in contrast to the above-mentioned conventional technique, separation or movement of the element from the front end of the tube can be prevented. Therefore, since heat transferability from the front end of the tube to the element is not damaged, deterioration in responsiveness or temperature sensitivity can be prevented. That is, the temperature sensor of the present invention is configured to stably maintain a state in which the element contained in the tube is in contact with the front end of the tube. Thus, the cement can be eliminated, depending on the shape of a front end portion of the tube or the gap (dimension) between the inner circumferential surface of the front end portion of the tube and each of the element and the outer circumferential surface of the insulation sheath. That is, the cement can be eliminated by minimizing the gap. In this case, the structure can be simplified, and a cement charging step and a cement drying step can be eliminated, whereby the efficiency of assembly can be improved. The temperature sensor element is configured such that electrode wires are connected to a temperature-sensing element, such as a thermistor. In the present invention, the temperature sensor element is not limited to an exposed temperature sensor element, includes a temperature sensor element coated with glass or an insulating ceramic.

Also, as described above, according to the present invention, by virtue of rubber-like elasticity effected through deformation of the elastic seal member, the frontward-oriented surface of the elastic seal member presses the rear end of the insulation sheath. This structural feature prevents lateral oscillation of the rear end of the insulation sheath. Therefore, this structural feature also prevents breakage of the core wire(s) projecting from the rear end of the insulation sheath. Further, an independent component is not required for pressing the rear end of the insulation sheath. Thus, a temperature sensor having excellent vibration resistance and durability can be implemented without increasing cost.

In place of utilizing deformation (rubber-like elasticity) of the elastic seal member having rubber-like elasticity as in the case of the present invention, the use of a hard member (hereinafter, referred to as a resin member) which cannot be deformed or which resists being deformed, such as a resin member, for pressing the sensor element against the front end of the tube might be considered. However, when such a resin member is used, unless the dimensional accuracy of the resin member is very high, the element cannot effectively press against the front end of the tube, or the element is pressed with excessive force against the front end and may brake. By contrast, in the case of using a member having rubber-like elasticity such as the elastic seal member of the present invention, even if a relatively large dimensional error is involved in the course of manufacture, the element can be readily pressed against the front end of the tube with an appropriate force and without breaking the element. Also, if the seal member is formed of the resin, upon occurrence of a dimensional change associated with deterioration of the resin, the element fails to maintain a state of contact with the front end of the tube. By contrast, in the case of using an elastic seal member having rubber-like elasticity as in the present invention, even when the seal member deteriorates to some extent, a frontward pressing force is merely weakened. That is, in the case of using an elastic seal member having rubber-like elasticity, even when the elastic seal member deteriorates to some extent, a pressing force still remains. Therefore, as compared with the case of the seal member made of resin, the elastic seal member having rubber-like elasticity can stably maintain contact between a front end portion of the element and the front end of the tube over a long period of time.

In the present invention, it suffices that, by deforming the seal member, the seal member can press the insulation sheath frontward. Thus, it suffices that the seal member can be deformed so as to move frontward the frontward-oriented surface of the seal member which faces the rear end of the insulation sheath. Such deformation of the seal member can also be implemented by crimping the rear end of the tube in a curled manner; i.e., by bending inward the rear end of the tube so as to press the seal member frontward. However, preferably, as described in (2) above, a rear end portion of the tube or a portion of the tube located toward the rear end of the tube is crimped in a radially compressed manner. Conventionally, in order to maintain a seal at a rear end portion of the tube, a rear end portion of the tube or a portion of the tube located toward the rear end of the tube is circularly or polygonally crimped in a radially compressed manner along the full circle, thereby radially compressing a portion of the seal member disposed in the portion of the tube. As a result of such crimping, the internally disposed seal member is deformed so as to elongate in opposite directions along the front-rear direction.

Therefore, before crimping, the following condition is established: the insulation sheath is pressed frontward with an appropriate force, or the tube is placed upright with its front end facing down so that the element comes in contact with the front end of the tube under its own weight, and the seal member is held so that the frontward-oriented surface of the seal member is in contact with the rear end of the insulation sheath. In this condition, crimping is performed as mentioned above, whereby the insulation sheath can be readily pressed frontward.

If the seal member is not easy to deform, in order to press the element against the front end of the tube in a desired condition, crimping may be performed in a state in which a load (pre-load) is applied to the seal member. A desired pressing force to be induced by crimping varies from sensor to sensor. However, crimping conditions may be determined according to the elasticity, deformability, hardness, or the like of the seal member, so as to deform the seal member in such manner that the frontward-oriented surface of the seal member is appropriately displaced frontward. A desired range of force with which the element is pressed against the front end of the tube is about 5 N to 10 N.

In the present invention, the temperature sensor element and the front end of the insulation sheath may be in direct contact with each other. Alternatively, as described in (3) above, an insulation member may intervene therebetween. According to the temperature sensor of the present invention, as described above, the use of cement for fixing the insulating sheath can be eliminated, depending on the shape of a front end portion of the tube. In the present invention including the case where no cement is used, preferably, as described in (4) above, the front end of the tube has an inner surface (rearward-oriented surface) having a substantially semispherical concave shape, and the frontward-oriented surface of the temperature sensor element has a substantially semispherical convex shape which fits the substantially semispherical concave shape of the inner surface of the front end of the tube.

As in conventional practice, in the present invention, cement may be charged between the inner circumferential surface of a portion of the tube located toward the front end of the tube and each of the element and the outer circumferential surface of a portion of the insulation sheath located toward the front end of the insulation sheath. However, by virtue of the above-mentioned effects, the use of cement can be eliminated. In this case, as described in (5) above, preferably, the inner circumferential surface of a portion of the tube located toward the front end of the tube has a diameter able to accommodate at least a portion of the insulation sheath located toward the front end of the insulation sheath in a loose fit condition. The smaller the gap, the better, so long as assembly is enabled.

Usually, the insulation sheath used in the thus-configured temperature sensor is manufactured in the form of a straight tube which has a uniform diameter (a tube extending straight) and whose rear end surface is a plane perpendicular to the axis of the insulation sheath. Accordingly, an edge defined by the rear end surface and the outer circumferential surface of the insulation sheath (the outer circumferential edge of the rear end surface) is in a state of a sharp knife-edge unless the edge is chamfered by grinding or the like in the circumferential direction. Even when such chamfering is performed, the chamfer is usually of a very small dimension in view of workability and cost. Meanwhile, preferably, in view of simplification of structure, the temperature sensor is configured such that the frontward-oriented surface of the seal member (rubber) directly presses (compresses) the rear end (rear end surface) of the insulation sheath frontward. However, in such a configuration, a shearing force is imposed on a circular portion of the frontward-oriented surface of the seal member against which the outer circumferential edge of the rear end (rear end surface) of the insulation sheath is pressed. That is, a state of the rear end (rear end surface) of the insulation sheath being pressed frontward by the frontward-oriented surface of the seal member means that the frontward-oriented surface of the seal member is deformed as follows: a portion of the frontward-oriented surface of the seal member which is in contact with the rear end (rear end surface) of the insulation sheath is depressed rearward. Thus, a compression stress is imposed on the portion of the frontward-oriented surface, whereas such stress is not imposed on the other portion of the frontward-oriented surface located outside the outer circumferential edge of the rear end (rear end surface) of the insulation sheath.

Meanwhile, when rubber of the seal member is subjected to such stress at high temperature, coupled with thermal expansion of the rubber itself, the stress is further increased. Furthermore, because of a shearing action of the knife-edge-like outer circumferential edge of the rear end of the insulation sheath, a crack is apt to generate in the circular portion of the frontward-oriented surface of the seal member against which the outer circumferential edge of the rear end of the insulation sheath is pressed, or in the vicinity of the circular portion. When such a crack is generated, the crack progresses or grows in the seal member, potentially resulting in so-called rubber cut (crack).

By contrast, according to the inventions described in (7) to (11) above, the protrusion formed on the frontward-oriented surface of the seal member presses the insulation sheath frontward at a portion located inside the outer circumferential edge of the rear end of the insulation sheath. Accordingly, by the effect of associated reaction force, the rear end of the insulation sheath presses the protrusion formed on the frontward-oriented surface of the seal member rearward. In this case, even though the outer circumferential edge of the rear end of the insulation sheath is in a state of a sharp knife-edge, the outer circumferential edge is unlikely to compress the frontward-oriented surface of the seal member. Thus, an effect of preventing the above-described generation of a crack or the like in the frontward-oriented surface of the seal member is obtained.

Particularly, as in the case of the invention described in (7) above, in the case where the recess is formed at the front end of the seal member, and the rear end of the insulation sheath is located within the recess, an effect of restraining radially lateral oscillation of the rear end of the insulation sheath by means of the wall surface of the recess is obtained.

The protrusion in (7) or (8) above may be formed on the frontward-oriented surface of the seal member or on the frontward-oriented surface which is the bottom of the recess so as to protrude (bulge) frontward. No particular limitation is imposed on the specific shape of the protrusion. Thus, the protrusion may be in the shape of a truncated cone, a truncated pyramid, a circular cylinder, a prism, or a tube, but preferably has a substantially semispherical convex shape. As used herein, the substantially semispherical shape means a dome-like shape. The protrusion may assume the form of a single protrusion (a single island) or the form of a plurality of protrusions (a group of protrusions). However, in the case where the protrusion has a substantially semispherical shape, as mentioned above, employing a single protrusion is preferred in view of structural simplicity.

In the case where the protrusion has a substantially semispherical shape formed over the entirety of the frontward-oriented surface which is the bottom of the recess, preferably, as described in (11) above, a concavely radiused fillet is formed at a corner located at the bottom of the recess and defined by the surface of the protrusion and the wall surface of the recess, along the circumferential direction of the wall surface. The reason for this is as follows. For example, an insulation sheath (circular sheath) used in a temperature sensor for measuring the exhaust gas temperature of an automobile has an outside diameter of 2 mm to 3 mm; therefore, a recess which accommodates the rear end of the insulation sheath also has a small inside diameter of 2 mm to 3 mm. Thus, in the case of a semispherical protrusion, the protrusion has a diameter of about 1 mm to 1.5 mm. As used herein, the term "semisphere" encompasses one of segments formed by dividing a sphere in half or less. Preferably, the diameter of the protrusion is made as large as possible as measured on the bottom of the recess. Thus, the protrusion assumes a single semispherical shape which bulges from the entire frontward-oriented surface which is the bottom of the recess. In this case, if a concavely radiused fillet is not formed at the corner located at the bottom of the recess and defined by the surface of the protrusion and the wall surface of the recess, as a result of compression of the protrusion by the rear end of the insulation sheath, the protrusion is deformed such that the angle of the corner increases. Thus, stress concentrates on the corner, and a crack is apt to generate. However, as described in (11) above, in the case where the concavely radiused fillet is formed, the generation of stress concentration can be restrained accordingly. Therefore, an effect of preventing the generation of a crack is obtained. In the light of above, it is good practice to form a concavely radiused fillet whose radius is increased to the greatest possible extent, at the corner. That is, preferably, at the bottom of the recess formed at the front end of the seal member, the wall surface of the recess and the surface of the semispherical protrusion are connected together via a smoothly curved surface (having a smooth curve as viewed on a longitudinal section).

DESCRIPTION OF REFERENCE NUMERALS

Figure 1:
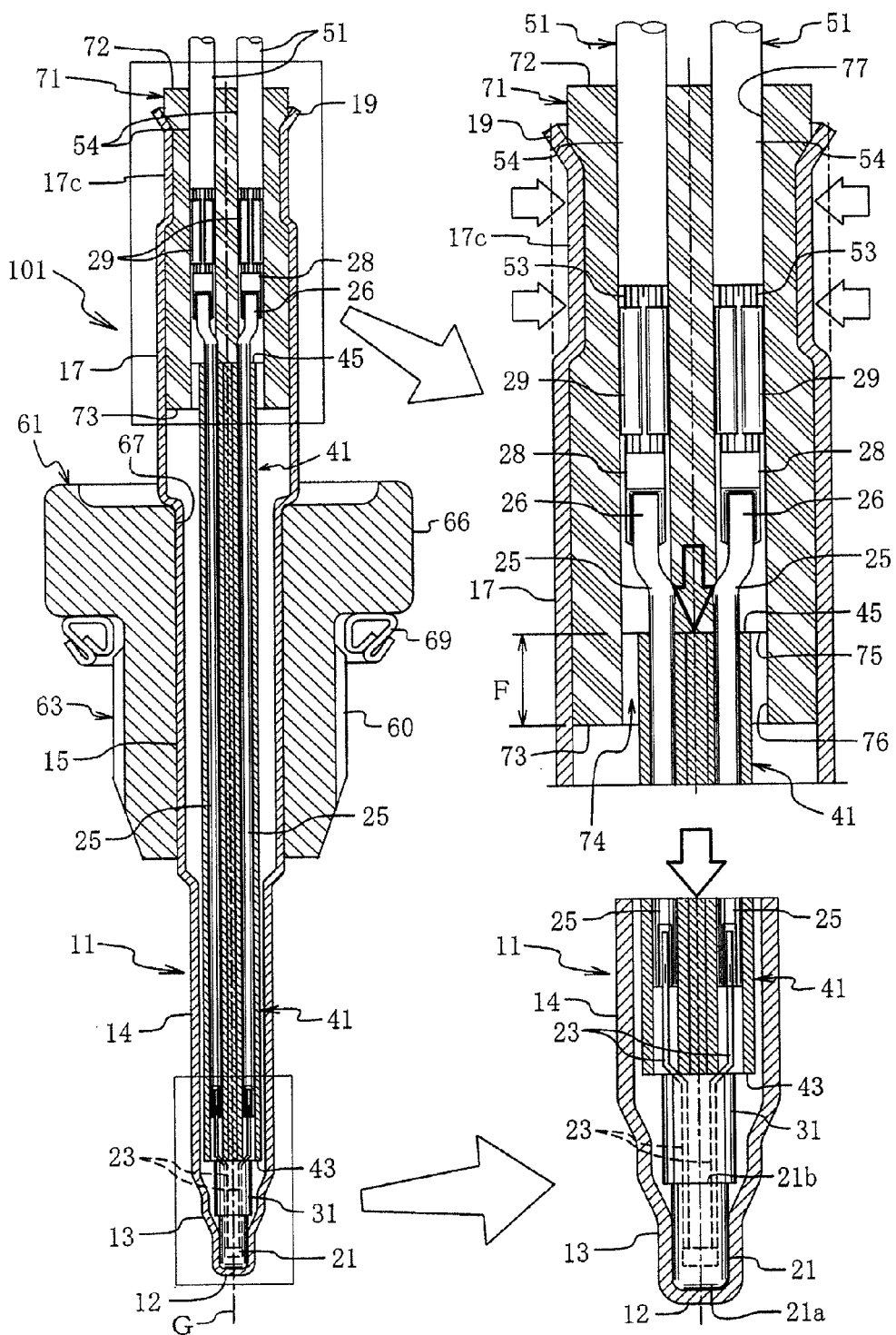
FIG. 1 is a central longitudinal sectional view showing a temperature sensor according to an embodiment of the present invention, and includes enlarged views showing essential portions of the temperature sensor.

Reference numerals used to identify various structural features in the drawings include the following.
11: tube
12: front end of tube
19: rear end of tube
21: temperature sensor element
21a: front end of temperature sensor element
23: electrode of temperature sensor element
25: core wire
26: rear end portion of core wire
31: element support (insulation member)
41: insulation sheath
45: rear end of insulation sheath
51: lead wire
71, 171, 271, 371, 471: seal member
74: recess at the front end of the seal member
75: frontward-oriented surface of the seal member
78: protrusion
101: temperature sensor

DETAILED DESCRIPTION OF THE PREFERRED EMBODIMENTS

The invention will next be described in greater detail by reference to the drawings. However, the present invention should not be construed as being limited thereto.

A temperature sensor according to an embodiment of the present invention will now be described in detail with reference to FIGS. 1 and 2. In FIG. 1, reference numeral 101 denotes a temperature sensor. The temperature sensor 101 includes a tube 11 made of metal (e.g., SUS) and having a closed front end 12; a temperature sensor element 21, which is disposed within the tube 11 such that the front end thereof is pressed against the front end 12 of the tube 11; an element support 31, which is an insulation member and is disposed rearward (upward in FIG. 1) of the element 21 within the tube 11 and through which electrode wires 23 extend rearward from the element 21; and an insulation sheath 41, which is a wiring insulator and is disposed rearward of the element support 31 and through which core wires 25 connected to the respective electrode wires 23 extend rearward. The core wires 25 project rearward from a rear end 45 of the insulation sheath 41, and lead wires 51 are connected to the core wires 25 via metal terminals 28, respectively. Front end portions (core wires) 53 of the lead wires 51, including connections between the core wires 25 and the lead wires 51, and insulation resin layers 54 extend through a seal member 71 disposed in a rear end portion of the tube 11 or in a portion of the tube 11 located toward a rear end 19 of the tube 11. The seal member 71 is made of rubber. The portion of the tube 11 located toward the rear end 19 of the tube 11 is crimped in a radially compressed manner, whereby the seal member 71 made of rubber is deformed and fixed in a portion of the tube 11.

In the present embodiment, a recess 74 is provided at a front end 73 of the seal member 71. The rear end 45 of the insulation sheath 41 is located within the recess 74 and is pressed against a frontward-oriented surface 75 which is the bottom of the recess 74. That is, in the sensor 101 of the present embodiment, by utilizing deformation of the seal member 71 effected by the crimping described above, and by virtue of the rubber-like elasticity of the seal member 71, when crimping is performed, the frontward-oriented surface 75 which is the bottom of the recess 74 presses the rear end 45 of the insulation sheath 41 frontward as indicated by the downward arrow in FIGS. 1 and 2. Accordingly, the element 21 disposed frontward of the insulation sheath 41 is pressed against the front end 12 within the tube 11. The thus-configured sensor 101 of the present embodiment is mounted to an exhaust manifold via a mounting metal fitting 61, which is fixedly and externally fitted to the tube 11. Next, such a configuration will be described in detail.

First, the tube 11 is described. In the present embodiment, as shown in FIG. 1, etc., the tube 11 has a thin-walled cylindrical shape composed of coaxial cylindrical portions whose diameters sequentially increase from the front end 12 toward the rear end (in FIG. 1, the upper end) 19. Specifically, an element accommodation portion 13 having a small diameter is a front end portion of the tube 11 extending rearward from the front end 12 over a predetermined range. An insulation sheath accommodation portion 14 is a straight tube portion extending rearward from the element accommodation portion 13 and having a diameter greater than that of the element accommodation portion 13. The inner circumferential surface of the insulation sheath accommodation portion 14 surrounds a front end portion of the insulation sheath 41 in a finely loose fit condition, thereby supporting the front end portion of the insulation sheath 41.

The tube 11 further has a mounting metal fitting attachment portion 15. The mounting metal fitting attachment portion 15 is a straight tube portion extending rearward from the insulation sheath accommodation portion 14 and having a diameter greater than that of the insulation sheath accommodation portion 14. The mounting metal fitting 61 adapted to mount the sensor 101 to an exhaust manifold or the like is concentrically and externally fitted to the mounting metal fitting attachment portion 15. The tube 11 further has a seal member accommodation portion 17. The seal member accommodation portion 17 is a straight tube portion extending rearward from the mounting metal fitting attachment portion 15 and having a diameter greater than that of the mounting metal fitting attachment portion 15. The seal member accommodation portion 17 accommodates therein a rear end portion of the insulation sheath 41, the seal member 71, etc.

Meanwhile, the insulation sheath 41 is a slender cylindrical sheath made of, in the present embodiment, ceramic, having two bores extending therethrough along an axis G, and having a constant outside diameter (cross section). The sensor element 21 coated with glass is disposed such that a rear end 21b of the sensor element 21 is pressed against a front end 43 of the insulation sheath 41 via the element support (ceramic member) 31, which is, in the present embodiment, an insulation member. The two electrodes (electrode wires) 23 extending rearward from the element 21 extend through the element support 31 and are connected to the respective core wires 25 extending rearward through the insulation sheath 41. The rear ends of the core wires 25 project from the rear end 45 of the insulation sheath 41. The sensor element 21, the element support 31, and the insulation sheath 41 are disposed coaxially within the tube 11 as follows: the sensor element 21 and the element support 31, in rearward order, are situated within the element accommodation portion 13, and a front end portion of the insulation sheath 41 is situated within the insulation sheath accommodation portion 14. The rear end 45 of the insulation sheath 41 is situated at an axially intermediate position within the seal member accommodation portion 17. The element support 31, which is an insulation member, has a cylindrical shape whose diameter is smaller than that of the front end 43 of the insulation sheath 41 and greater than that of the rear end 21b of the sensor element 21.

Figure 3:
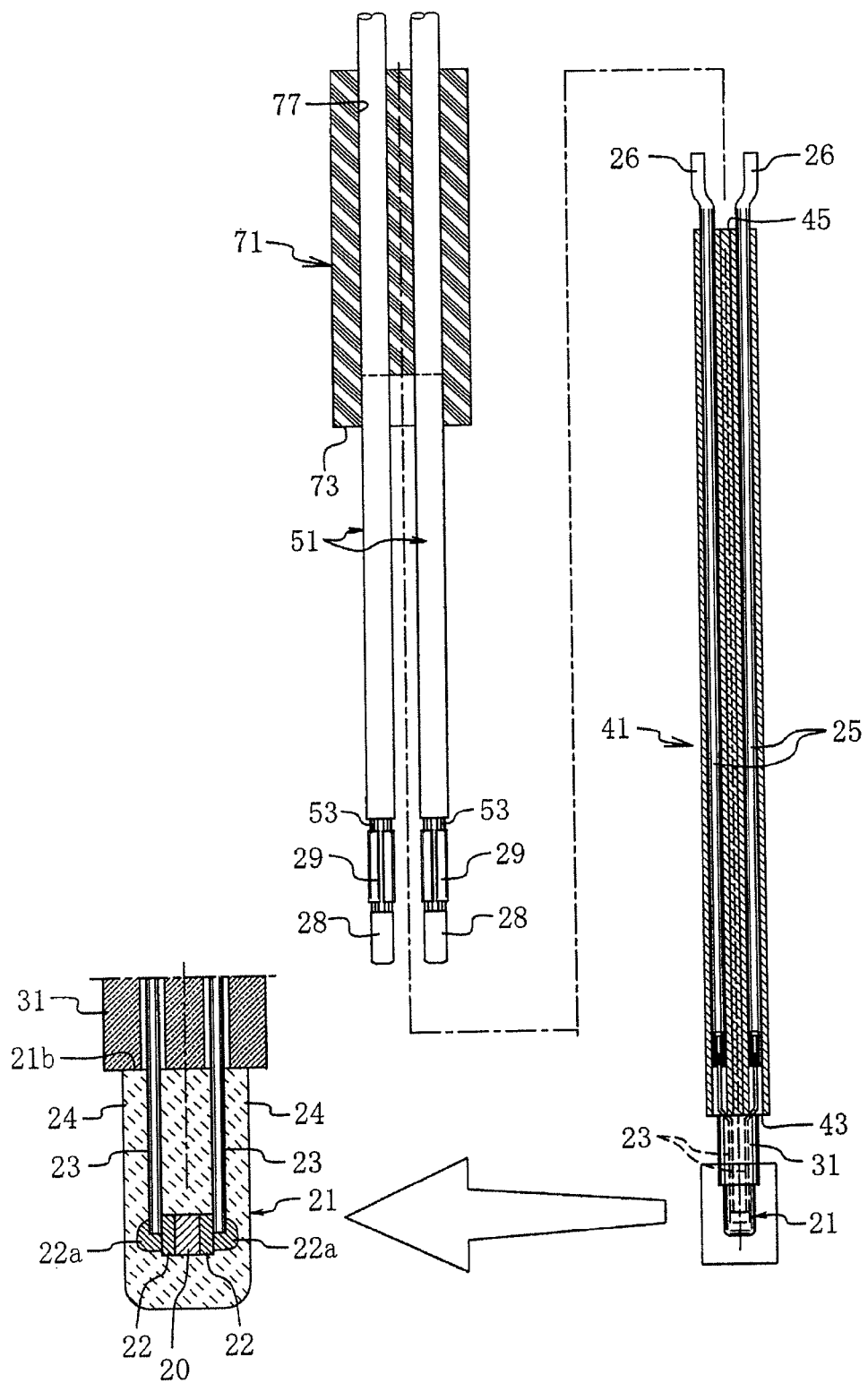
FIG. 3 is an explanatory view showing a step in the course of assembly of the sensor of FIG. 1, and an enlarged sectional view showing a temperature sensor element.

The structure of the temperature sensor element 21 used in the sensor 101 of the present embodiment will next be described in detail with reference to the enlarged view of FIG. 3. The temperature sensor element 21 includes a thermistor sintered-body 20, which serves as a temperature-sensing portion; a pair of electrode layers 22; a pair of the electrode wires 23; a pair of bonding electrodes 22a; and a glass seal portion 24. The thermistor sintered-body 20 is formed into a plate-like shape from a material which predominantly contains a metal oxide having a perovskite structure or a spinel structure. The thermistor sintered-body 20, which serves as a temperature-sensing element, has a resistance that varies with ambient temperature. The electrode layers 22 are electrodes formed of a noble metal, such as platinum (Pt) or gold (Au). The electrode layers 22 are formed on the respective lateral surfaces of the thermistor sintered-body 20 such that the thermistor sintered-body 20 is sandwiched therebetween. The electrode wires 23 are adapted to monitor variation in resistance of the thermistor sintered-body 20 and are formed of dumet wires. Each of the electrode wires 23 has a diameter (wire size) of 0.20 mm. The paired electrode wires 23 are joined to the paired respective electrode wires 22 by means of the paired bonding electrodes 22a. The bonding electrodes 22a are adapted to join the electrode wires 23 to the electrode layers 22, respectively. Similar to the electrode layers 22, the bonding electrodes 22a are formed of a noble metal such as platinum (Pt) or gold (Au). The glass seal portion 24 covers front end portions of the paired electrode wires 23, the thermistor sintered-body 20, and the paired electrode layers 22. The glass seal portion 24 internally retains the covered members (the thermistor sintered-body 20, etc.) and protects the covered members from an external environment.

As described above, in the present embodiment, a front end portion of the insulation sheath 41 is disposed within the insulation sheath accommodation portion 14 of the tube 11, and is supported by the inner circumferential surface of the insulation sheath accommodation portion 14 so as to be surrounded by the inner circumferential surface with a very small clearance therebetween. Meanwhile, a relatively large space exists between the inner circumferential surface of the tube 11 and a portion of the insulation sheath 41 located rearward of the thus-supported front end portion of the insulation sheath 41. Cement is not necessarily charged into the clearance between the inner circumferential surface of the insulation sheath accommodation portion 14 of the tube 11 and the corresponding outer circumferential surface of the insulation sheath 41. However, in the present embodiment, although unillustrated, cement is charged into the clearance.

In the present embodiment, the seal member 71 made of rubber and disposed within the seal member accommodation portion 17 of the tube 11 has a substantially circular columnar shape. The front end portions (core wires) 53 of the lead wires 51, which extend outward from a rear end 72 of the seal member 71, are connected to respective rear end portions 26 of the core wires 25, which extend outward from the rear end 45 of the insulation sheath 41, via the metal terminals 28. In the present embodiment, the recess 74 having a depth F is formed in the seal member 71 at the center of the front end 73 of the seal member 71. The recess 74 has a circular cross section and allows the rear end 45 of the insulation sheath 41 to be fitted therein in a loose fit condition. The rear end 45 of the insulation sheath 41 is fitted into the recess 74. The connection portions between the core wires 25 and the lead wires 51 extend through respective through holes 77 which are formed in the seal member 71 as follows: the through holes 77 extend through the seal member 71 between the rear end 72 of the seal member 71 and the frontward-oriented surface 75 of the seal member 71; i.e., the bottom (bottom surface) of the recess 74, in parallel with each other along the axis G which intervenes therebetween.

By means of a rear end portion 17c of the seal member accommodation portion 17 of the tube 11 being crimped in a radially compressed manner, the seal member 71 is fixed in the seal member accommodation portion 17 of the tube 11; a seal is maintained between the outer circumferential surface of the seal member 71 and the inner circumferential surface of the seal member accommodation portion 17; and a seal is maintained between the inner circumferential surface of each of the through holes 77 and the outer circumferential surface of each of the insulation resin layers 54, which are coatings of the lead wires 51 extending through the through holes 77, and the lead wires 51 are fixed accordingly. In a state in which the seal member accommodation portion 17 of the tube 11 is crimped in a radially compressed manner, in the present embodiment, a portion of the seal member 71 located toward the rear end of the seal member 71 is deformed in a radially compressed manner. In association with the deformation, a portion of the seal member 71 located toward the front end of the seal member 71 is deformed so as to be elongated frontward. Accordingly, in the present embodiment, by virtue of rubber-like elasticity, the frontward-oriented surface 75 which is the bottom of the recess 74 directly presses the rear end 45 of the insulation sheath 41 (see FIG. 2) frontward as indicated by the downward arrow in FIGS. 1 and 2. In the present embodiment, the pressing force presses the rear end 21b of the element 21 frontward via the element support 31 disposed on the front end 43 of the insulation sheath 41. Accordingly, a front end 21a of the element 21 is pressed against the inner surface of the front end 12 of the tube 11.

In the sensor 101 of the present embodiment, as described above, the mounting metal fitting 61 is concentrically, externally, and fixedly fitted to the mounting metal fitting attachment portion 15, which is an intermediate portion of the tube 11. Specifically, in order to threadingly fix the sensor 101 in a mounting hole (threaded hole) of an exhaust manifold, the mounting metal fitting 61 has a cylindrical shape having threads 60 formed on its outer circumferential surface. An inner circumferential surface 67 of the mounting metal fitting 61 and the outer circumferential surface of the mounting metal fitting attachment portion 15 are, for example, fixed by brazing. The mounting metal fitting 61 has an integrally formed screwing polygonal portion 66 projecting radially outward and located rearward of a threaded tube portion 63 having the threads 60. An annular washer 69 is disposed on the front end surface of the screwing polygonal portion 66 and an outer circumferential surface (at the proximal end of a series of the threads 60) of the threaded tube portion 63.

A process of assembling the temperature sensor 101 will next be described with reference to FIGS. 3 to 5. As shown at the right of FIG. 3, the core wires 25 forming a junction are connected to respective electrode wires 23, which extend rearward from the element 21 and from the element support 31 disposed at the rear end 21b of the element 21. The rear end portions 26 of the core wires 25 are withdrawn from the rear end 45 of the insulation sheath 41 and are then bent appropriately. The element 21 is disposed at the front end 43 of the insulation sheath 41 via the element support 31. Meanwhile, the lead wires 51 are passed through the respective through holes 77 of the seal member 71. The front end portions 53 of the lead wires 51 are withdrawn from the front end 73 of the seal member 71. Crimp portions 29 of the metal terminals 28 are fixedly crimped onto the respective front end portions (core wires) 53 (see the figure at the left of FIG. 3).

Figure 4:
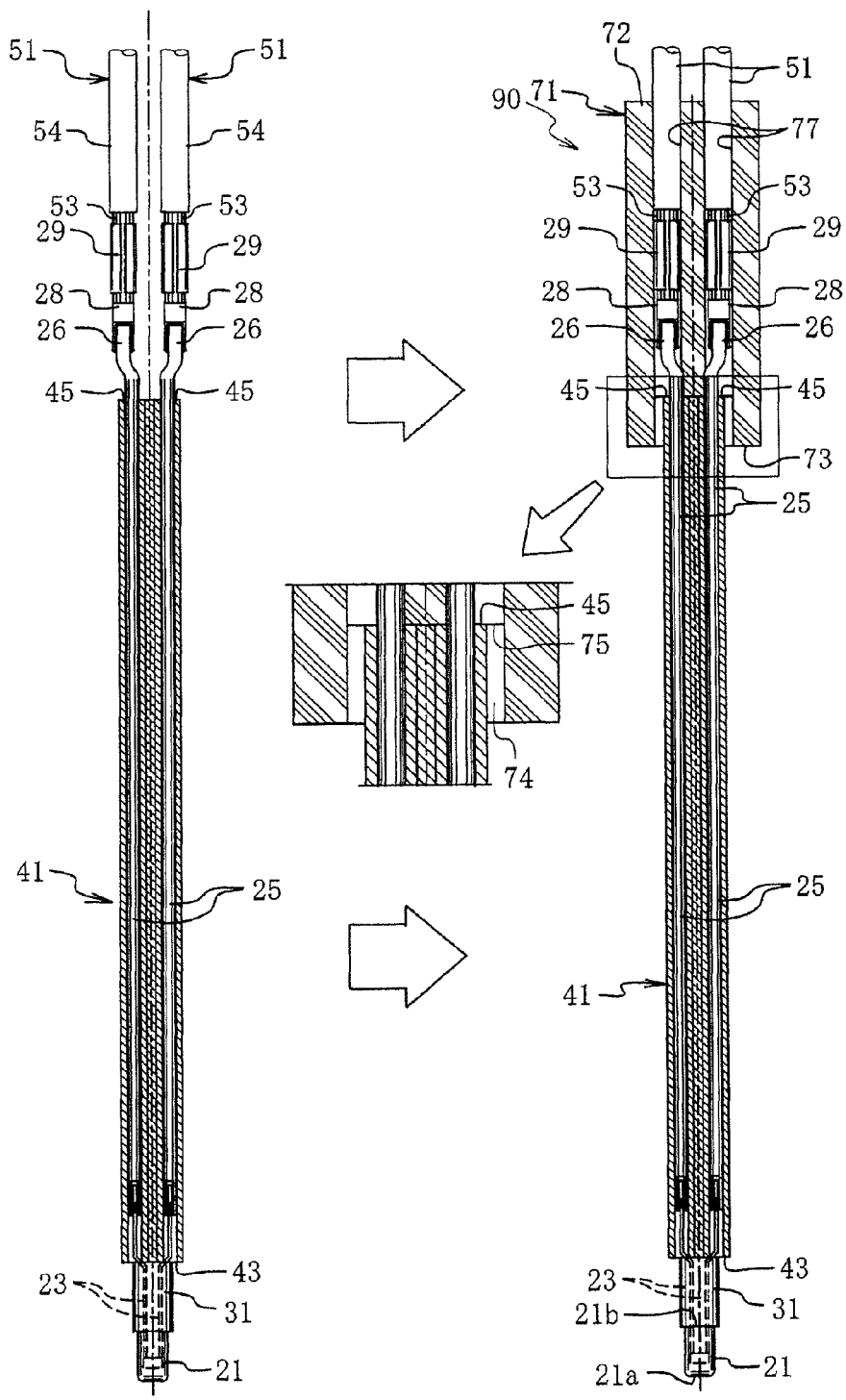
FIG. 4 is an explanatory view showing a step in the course of assembly of the sensor of FIG. 1.
Figure 5:
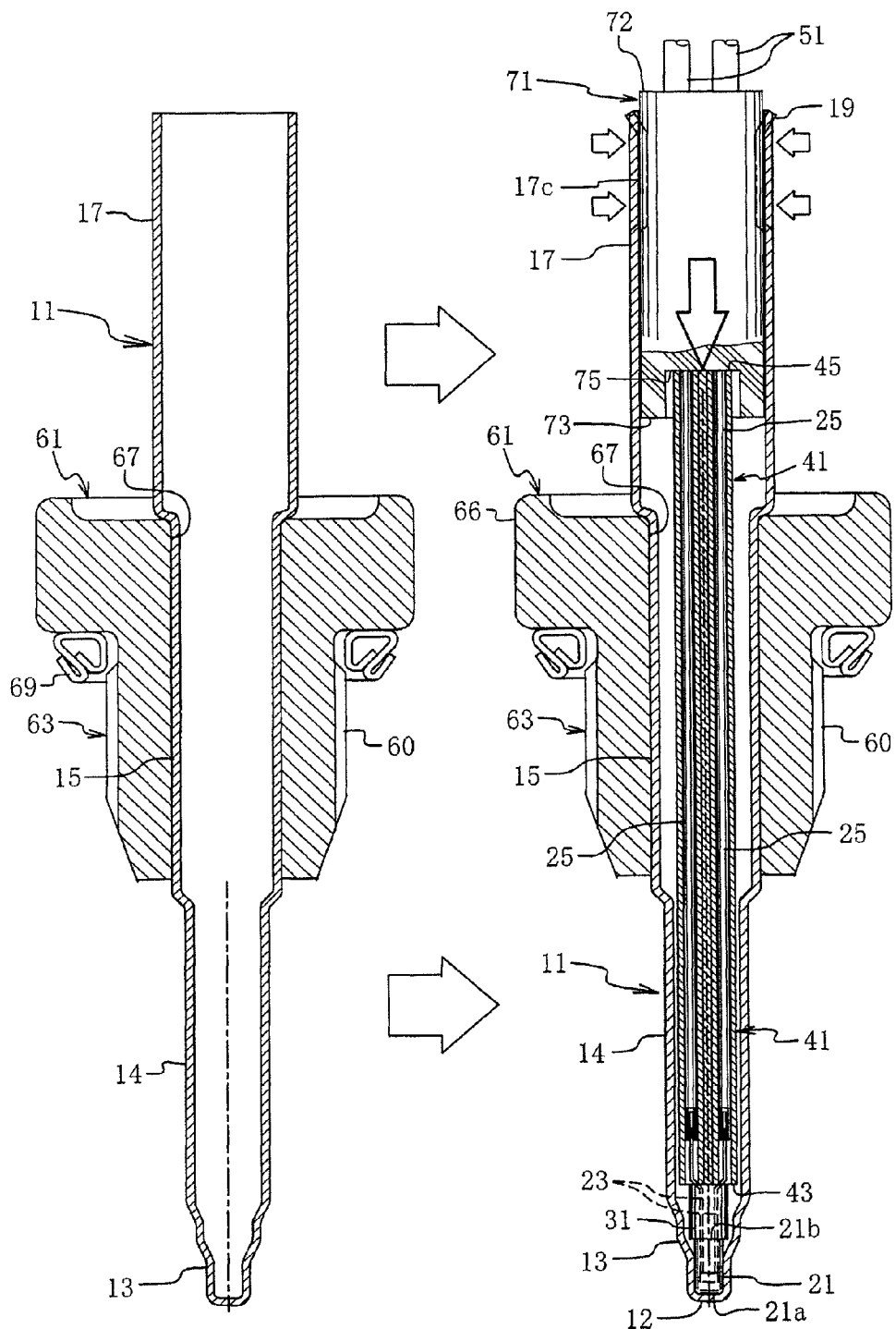
FIG. 5 is an explanatory view showing a step in the course of assembly of the sensor of FIG. 1.

Next, the metal terminals 28 are welded to the respective rear end portions 26 of the core wires 25 drawn from the rear end 45 of the insulation sheath 41 (see the figure at the left of FIG. 4). As shown in the figure at the right of FIG. 4, the lead wires 51 are drawn from the rear end 72 of the seal member 71 so as to bring the front end portions 53 of the lead wires 51, the metal terminals 28, and the rear end portions 26 of the core wires 25 into the through holes 77. In this manner, an insert assembly 90 is assembled (see the figure at the right of FIG. 4). At this time, as shown in the enlarged figure in FIG. 4, the rear end 45 of the insulation sheath 41 is brought into the recess 74 formed in the front end surface of the seal member 71, and brought into contact with the frontward-oriented surface 75 which is the bottom of the recess 74.

Next, the insert assembly 90 is inserted into the tube 11 (see the figure at the left of FIG. 5) to which the mounting metal fitting 61 is externally and fixedly fitted. At this time, as shown in the figure at the right of FIG. 5, the front end 21a of the element 21 is brought into contact with the front end 12 of the tube 11; the element support 31 located rearward of the element 21 is situated within the element accommodation portion 13; a front end portion of the insulation sheath 41 is situated within the insulation sheath accommodation portion 14; and cement (not shown) is injected into a relevant clearance. The seal member 71 is situated at a predetermined position within the seal member accommodation portion 17 of the tube 11. At this time, the seal member 71 is held such that the rear end 45 of the insulation sheath 41 located within the recess 74 of the seal member 71 is in contact with or pressed against the frontward-oriented surface 75 which is the bottom of the recess 74. However, in the case where, as a result of crimping, the seal member 71 is deformed frontward such that the frontward-oriented surface 75 can press the rear end 45 of the insulation sheath 41, the rear end 45 of the insulation sheath 41 is not necessarily in contact with or pressed against the frontward-oriented surface 75. Next, in a state in which the seal member 71 is held as described above, the rear end portion 17c of the seal member accommodation portion 17 of the tube 11 is, for example, circularly crimped in a radially compressed manner along the full circle, thereby radially compressing an associated portion of the seal member 71. By following this procedure, the temperature sensor 101 is obtained. No particular limitation is imposed on a portion of the tube 11 to be crimped, so long as the seal member 71 can be deformed in a desired manner. Therefore, the seal member accommodation portion 17, which is a rear end portion of the tube 11 or a portion of the tube 11 located toward the rear end of the tube 11, may be crimped at a portion located rearward of the rear end of the insulation sheath 41.

When this crimping operation is performed, because of associated compression, the frontward-oriented surface 75 which is the bottom of the recess 74 of the seal member 71 attempts to deform so as to move frontward. Thus, by the effect of rubber-like elasticity, the front-oriented surface 75 presses the rear end 45 of the insulation sheath 41 frontward as indicated by the downward arrow in FIG. 5. Accordingly, the front end 21a of the element 21 is pressed against the front end 12 of the tube 11. In the present embodiment, the frontward-oriented surface 75 of the seal member 71 directly presses the rear end 45 of the insulation sheath 41 frontward. However, another member may intervene therebetween. When the tube 11 is crimped at a position corresponding to the insulation sheath 41 as viewed from a radial direction, the seal member 71 is not deformed in such a manner as to press the rear end 45 of the insulation sheath 41 frontward; therefore, the front end 21a of the element 21 cannot be pressed against a front end portion of the tube 11. Thus, the tube 11 must be crimped at a position located rearward of the rear end 45 of the insulation sheath 41.

Next, the actions and effects of the temperature sensor 101 of the present embodiment will be described. As is apparent from the above description, according to the sensor 101, even when cement charged between the inner circumferential surface of the tube 11 and the outer circumferential surface of a portion of the insulation sheath 41 located toward the front end of the insulation sheath 41 is broken into pieces and scatters as a result of being subjected to vibration or the like, the element 21 remains pressed frontward by virtue of rubber-like elasticity of the frontward-oriented surface 75 which is the bottom of the recess 74 of the seal member 71. Therefore, since separation or movement of the element 21 from the front end 12 of the tube 11 can be prevented, responsiveness does not deteriorate. That is, according to the sensor 101 of the present embodiment, since the element 21 can remain stably in contact with the inner surface of the front end 12 of the tube 11, high responsiveness and temperature sensitivity can be stably maintained.

Because of the above-described pressing action, as discussed above, cement can be eliminated by means of sufficiently lessening the clearance (dimension) between the outer circumferential surface of the insulation sheath 41 and the inner circumferential surface of a portion of the tube 11 located toward the front end of the tube 11. In this case, the structure can be simplified, and a cement charging step and a cement drying step can be eliminated, whereby the efficiency of assembly can be improved. Additionally, since cement does not enter between the front end 12 of the tube 11 and the front end 21a of the element 21 in the interior of the tube 11, the front end 12 and the front end 21a can be reliably brought in direct contact with each other. Therefore, heat transferability from the front end 12 of the tube 11 to the element 21 can be reliably enhanced.

Further, according to the present sensor 101, since the frontward-oriented surface 75 of the seal member 71 presses the rear end 45 of the insulation sheath 41 frontward by means of rubber-like elasticity, the effect of preventing lateral oscillation of the rear end 45 of the insulation sheath 41 is obtained. Therefore, the effect of preventing breakage of the core wires 25 projecting from the rear end 45 of the insulation sheath 41 is also obtained. Particularly, according to the present embodiment, the recess 74 is provided at the front end 73 of the seal member 71, and the rear end 45 of the insulation sheath 41 is accommodated within the recess 74. Thus, the rear end 45 of the insulation sheath 41 is surrounded by a circumferential wall surface 76 of the recess 74. Accordingly, the effect of preventing lateral oscillation is quite high. Therefore, the temperature sensor 101 can exhibit excellent vibration resistance and durability.

Figure 6:
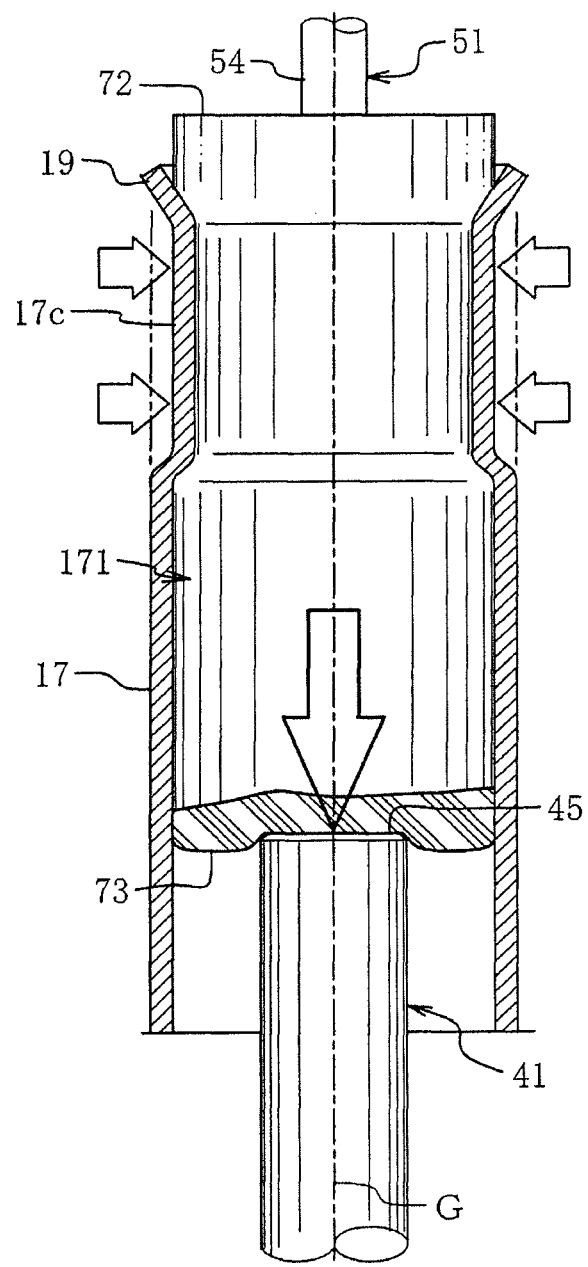
FIG. 6 is an enlarged partial sectional view showing essential portions of the sensor of FIG. 1 for explaining a modified embodiment of a seal member adapted to press the rear end of an insulation sheath in the sensor.

However, in the present invention, the above-described recess 74 is not mandatory. Specifically, as in the case of a modified embodiment shown in FIG. 6, the frontward-oriented surface 75 of a seal member 171 which presses the rear end 45 of the insulation sheath 41 frontward may be a mere flat front end surface (plane) of the seal member 171. In the case of the seal member 171 having a low rubber hardness and high rubber-like elasticity, since the front end 73 itself is deformed in a depressed manner as shown in FIG. 6, the effect of preventing lateral oscillation of the rear end 45 of the insulation sheath 41 is also obtained. Since the present modified embodiment involves no other points of difference in relation to the embodiment described above, components and structural features in FIG. 6 similar to those in the above-mentioned drawings are denoted by the same reference numerals. In the present invention, no particular limitation is imposed on the shape and structure of the frontward-oriented surface of the seal member 71, so long as the frontward-oriented surface 75 of the seal member 71 can press the rear end 45 of the insulation sheath 41 frontward. Therefore, for example, as in the case of a modified embodiment shown in FIG. 7, the frontward-oriented surface 75 of a seal member 271 may be defined by a recess which is formed at the front end 73 so as to fan out frontwards.

In the above-described embodiment, the element support 31, which is an insulation member, intervenes between the rear end 21b of the temperature sensor element 21 and the front end 43 of the insulation sheath 41. However, the element support 31 may be eliminated. In the case where the front end 43 of the insulation tube 41 is to directly press the rear end 21b of the sensor element 21 frontward, the inside diameter of the tube 11 near the front end 12 must be greater than the outside diameter of the insulation sheath 41 having a relatively large diameter. By contrast, in the case where the element support 31, which is an insulation member, intervenes between the insulation sheath 41 and the temperature sensor element 21, the inside diameter of a portion of the tube 11 located toward the front end 12 may be set so as to accommodate the element 21 having a relatively small diameter and the element support 31. Therefore, since the diameter of the portion of the tube 11 located toward the front end 12 can be reduced, the temperature sensitivity of the element 21 can be enhanced.

Figure 8:
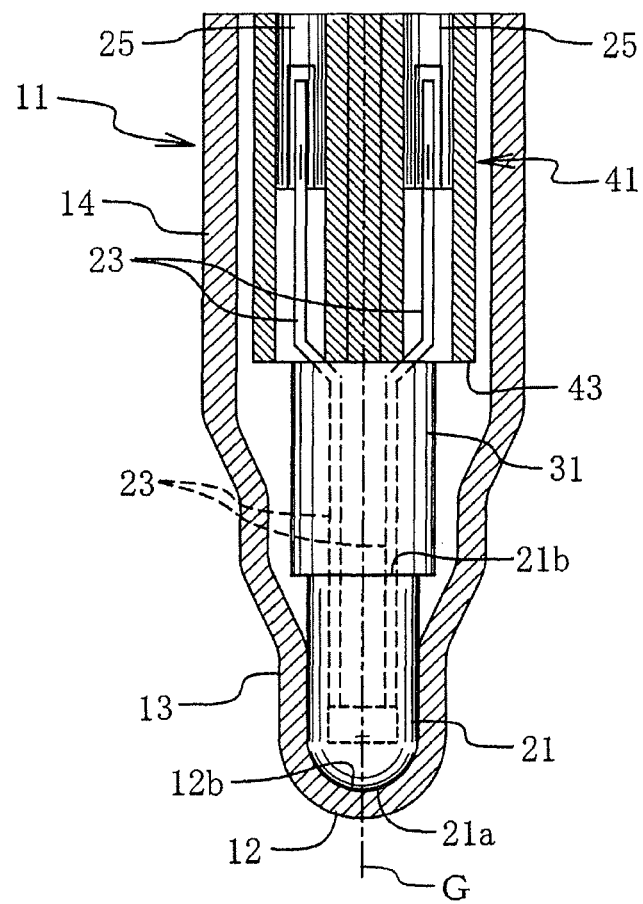
FIG. 8 is an enlarged partial sectional view showing essential portions of the sensor of FIG. 1 for explaining a modified embodiment of a front end portion of a tube in the sensor.

In the above-described embodiment, the front end of the tube 11 is relatively flat. However, the front end of the tube 11 may be formed as shown in FIG. 8; specifically, an inner surface (rearward-oriented surface) 12b of the front end 12 of the tube 11 has a substantially semispherical concave shape, and the front end 21a of the temperature sensor element 21 (the frontward-oriented surface of the outermost glass coating layer of the element 21) has a substantially semispherical convex shape which fits the substantially semispherical concave shape of the inner surface of the front end 12 of the tube 11. Employing such shapes establishes intimate contact therebetween; such that heat transferability to the element 21 is enhanced, and the element 21 is stably disposed.

Figure 9:
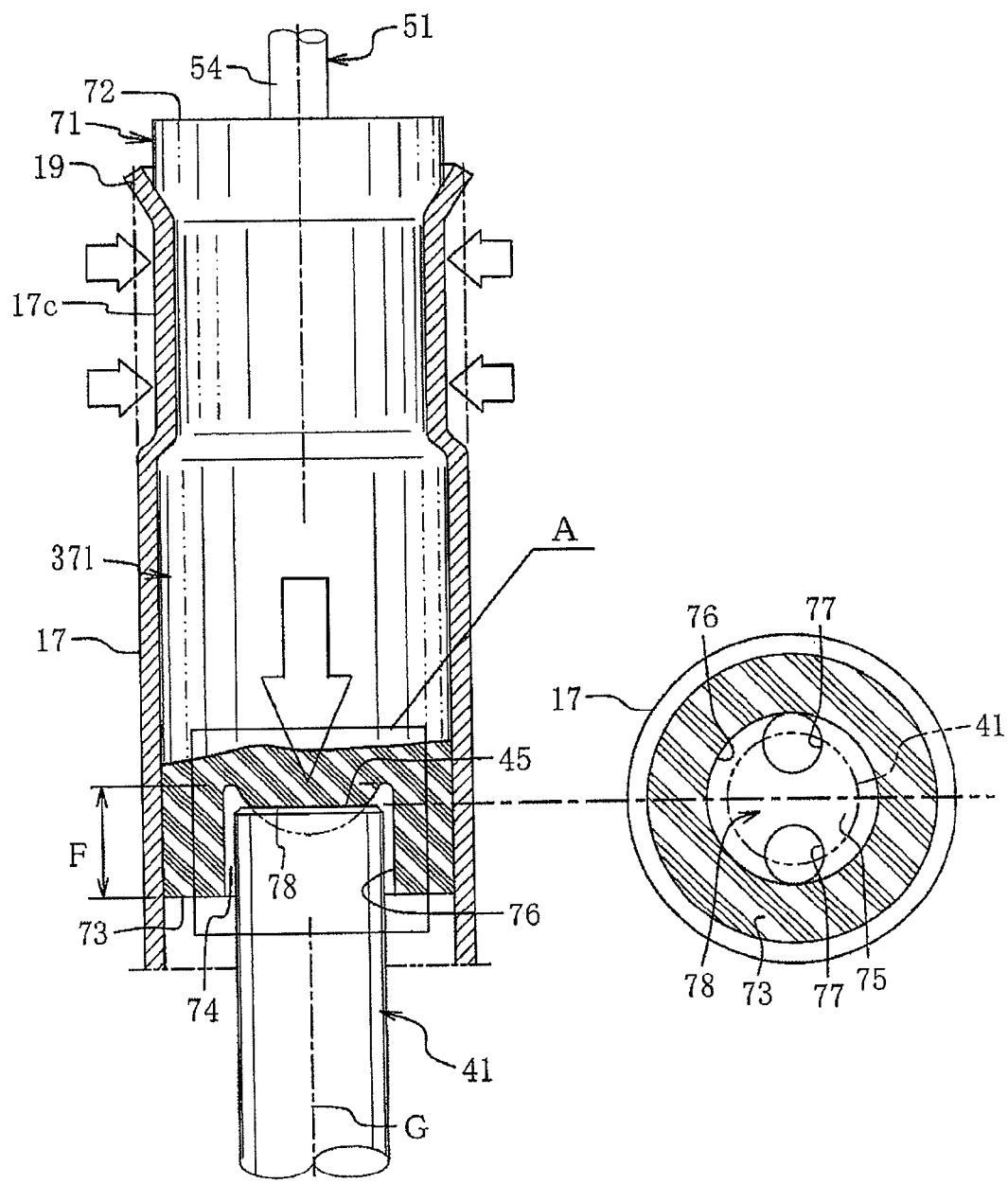
FIG. 9 is an enlarged central longitudinal sectional view showing essential portions of a temperature sensor according to another embodiment of the present invention, and a cross-sectional view thereof.
Figure 10:
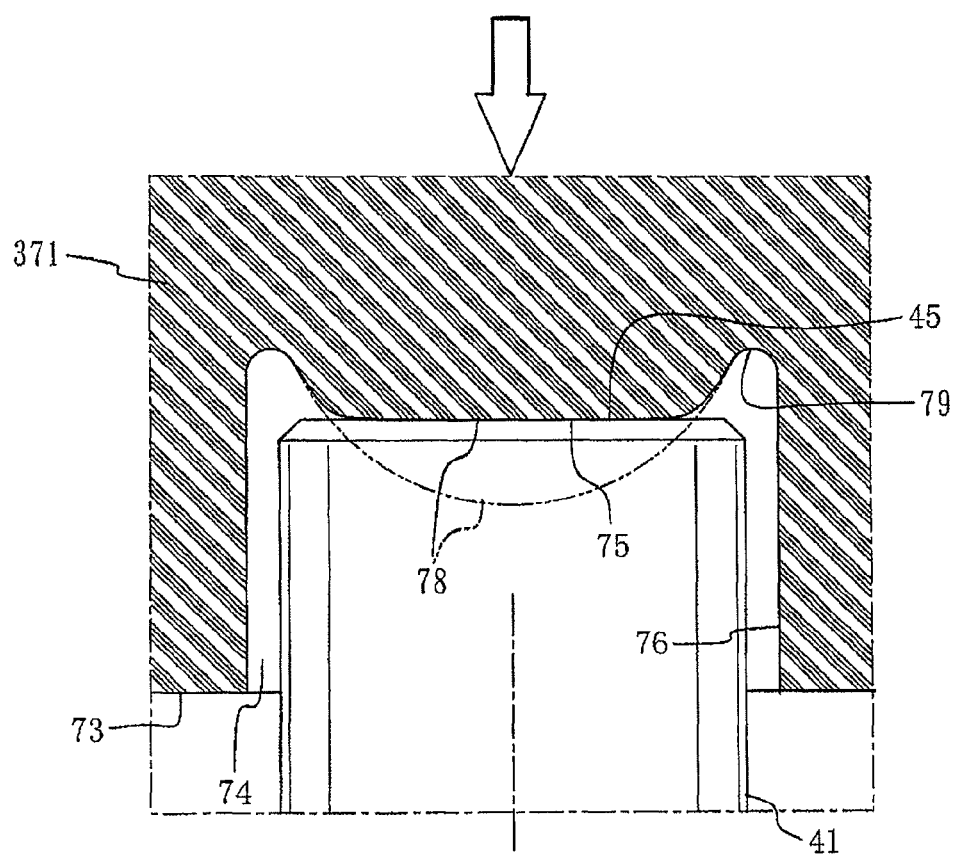
FIG. 10 is an enlarged view of portion A of FIG. 9.
Figure 11:
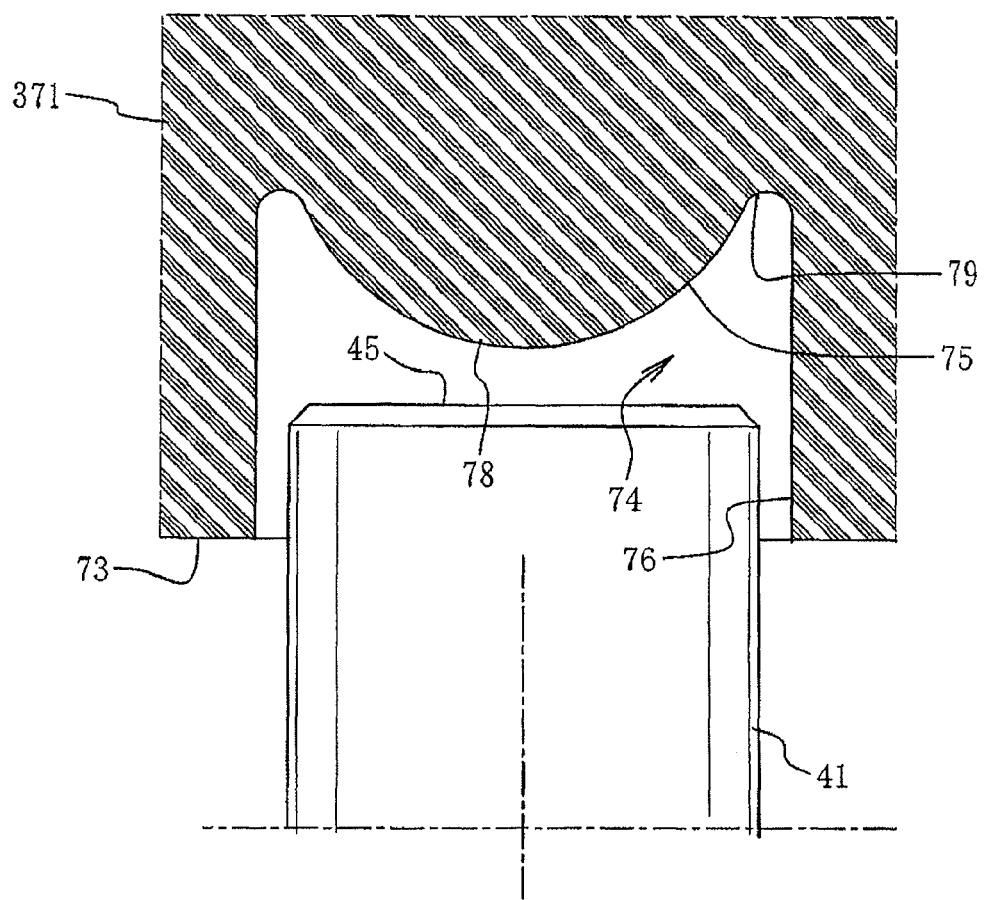
FIG. 11 is a view for explaining the shape of a protrusion formed on the frontward-oriented surface of the seal member as viewed before the rear end of the insulation sheath is pressed against the protrusion as shown in FIG. 10.

Next, another embodiment of the present invention will be described with reference to FIGS. 9 to 11. The present embodiment can be said to be an improved version of the above-described embodiment. The present embodiment differs from the embodiment which has been described above with reference to FIGS. 1 to 5, in the structure of the seal member 71; more specifically, only in the shape or structure of the frontward-oriented surface 75 which is the bottom of the recess 74 provided at the front end 73 of the seal member 71. Therefore, only the above point of difference will be described with reference to FIG. 9, which corresponds to the central longitudinal partially sectional view of FIG. 2, which, in turn, corresponds to the upper enlarged view of FIG. 1 showing essential portions of the temperature sensor. The above point of difference will also be described with reference to FIGS. 10 and 11, which are enlarged views showing essential portions of FIG. 9.

Figure 2:
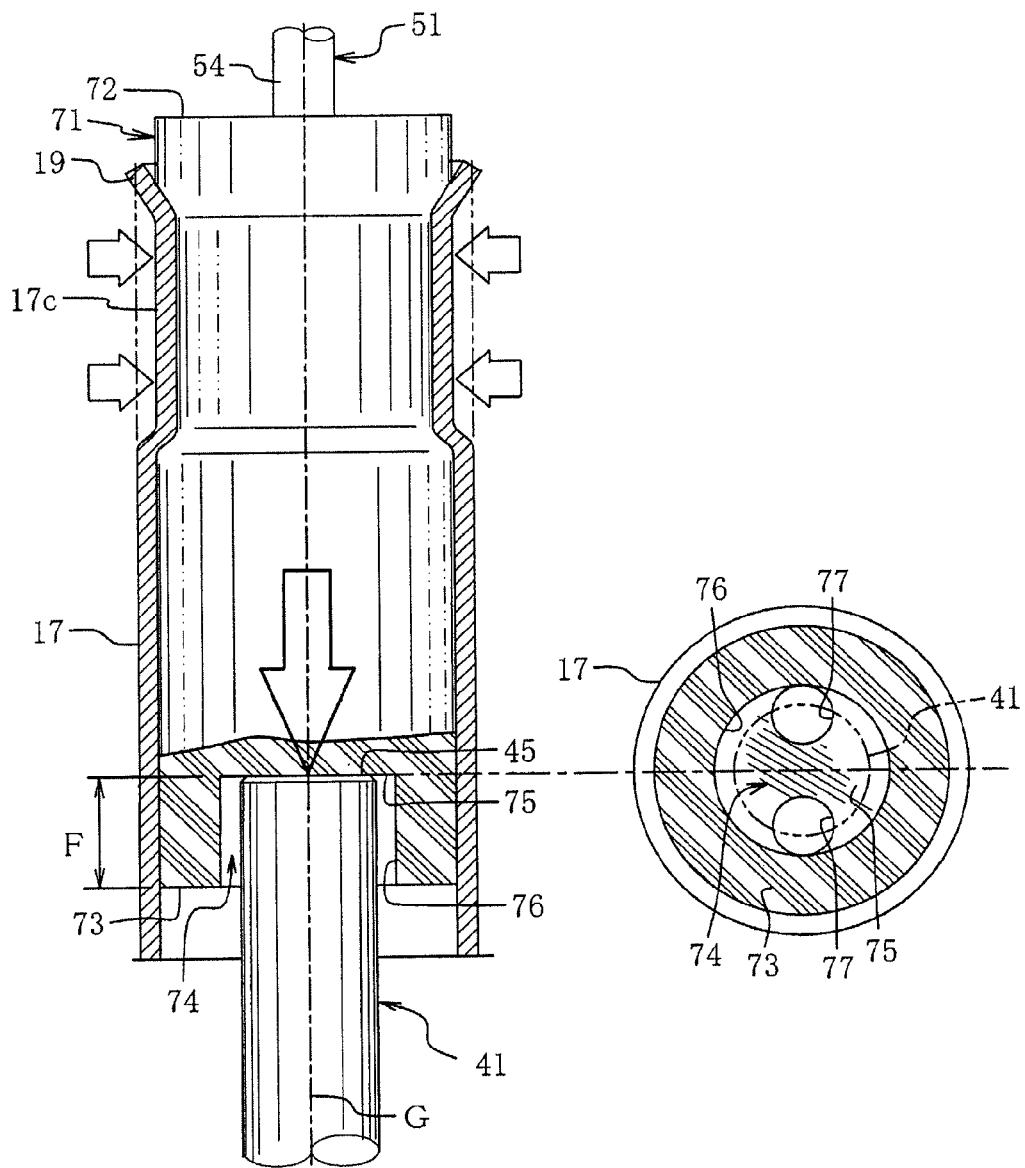
FIG. 2 is a central longitudinal partial sectional view corresponding to the upper enlarged view of FIG. 1 showing essential portions of the temperature sensor, and a cross-sectional view thereof.

According to the embodiment shown in FIGS. 1 and 2, the recess 74 is provided at the front end 73 of the seal member 71, and the frontward-oriented surface 75 which is the bottom of the recess 74 is a flat surface. By contrast, in the present embodiment, a protrusion (projection) 78 is formed frontward on the frontward-oriented surface 75 which is the bottom of the recess 74 formed at the front end 73 of a seal member 371. The recess 74 is circular as viewed from the end surface. The protrusion 78 is concentric with the frontward-oriented surface 75 which is the bottom of the recess 74. In a free state, the protrusion 78 assumes a single semispherical shape which bulges frontward (as represented by the long-dash-dot-dot line in FIGS. 9 and 10 and by the solid line in FIG. 11). In the present embodiment, the protrusion 78 bulges from the entire frontward-oriented surface 75 which is the bottom of the recess 74. Further, a concavely radiused fillet 79 is formed at (imparted to) a corner located at the bottom of the recess 74 and defined by the surface of the protrusion 78 and the wall surface 76 of the recess 74, along the circumferential direction of the wall surface 76. As shown in the cross-sectional view of FIG. 9, the through holes 77 open at the bottom of the recess 74; however, the through holes 77 are eliminated in the other drawings.

In the present embodiment, similar to the above-described embodiment, the recess 74 accommodates the rear end 45 of the insulation sheath 41. The inside diameter (the diameter of the wall surface) of the recess 74 is slightly greater than the outside diameter of the rear end 45 of the insulation sheath 41. A central portion of the rear end 45 of the insulation sheath 41 is pressed frontward by the top of the semispherical protrusion 78 formed on the frontward-oriented surface 75 which is the bottom of the recess 74. Thus, the protrusion 78 is compressively deformed. Similar to the above-described embodiment, this pressing action is effected by means of the rear end portion 17c of the seal member accommodation portion 17 of the tube 11 being crimped in a radially compressed manner. That is, deformation of the seal member 371 effected by the crimping operation is utilized as follows: after the crimping operation is performed, by the effect of rubber-like elasticity of the protrusion 78 itself, the protrusion 78 formed at the frontward-oriented surface 75 which is the bottom of the recess 74 presses the rear end 45 of the insulation sheath 41 frontward as indicated by the downward arrow in FIG. 9. Thus, similar to the above-described embodiment, the element 21 disposed in a front end portion of the tube 11 is pressed against the inner surface of the front end 12 of the tube 11.

In the present embodiment, the semispherical protrusion 78 formed at the bottom of the recess 74 presses the rear end (rear end surface) 45 of the insulation sheath 41 with the top of the semispherical protrusion 78 serving as the center of pressing. Thus, the outer circumferential edge of the rear end 45 (an edge defined by the rear end surface and the outer circumferential surface) of the insulation sheath 41 does not come into contact with rubber of the frontward-oriented surface 75 which is the bottom of the recess 74. Accordingly, even when the outer circumferential edge is in a state of a sharp knife-edge, the generation of a crack or cut in the frontward-oriented surface 75 can be restrained or prevented which is the bottom of the recess 74 formed in the seal member 371 made of rubber. Particularly, in the present embodiment, the concavely radiused fillet 79 is formed at a corner located at the bottom of the recess 74 and defined by the surface of the protrusion 78 and the wall surface 76 of the recess 74, along the circumferential direction of the wall surface 76. Accordingly, the generation of a crack in rubber at the corner can be effectively prevented, which otherwise is apt to result from a state in which the protrusion 78 formed on the frontward-oriented surface 75 which is the bottom of the recess 74 of the seal member 371 presses the rear end (rear end surface) 45 of the insulation sheath 41. That is, in the case where the radiused fillet 79 is not formed at the corner defined by the surface of the protrusion 78 and the wall surface 76 of the recess 74, a problem arises in that a crack or the like is generated in rubber starting from the corner. However, the formation of the radiused fillet 79 prevents the generation of such a crack or the like. The sufficing size (radius) of the radiused fillet 79 is about 0.1 mm; however, a greater radius is preferred.

Figure 12:
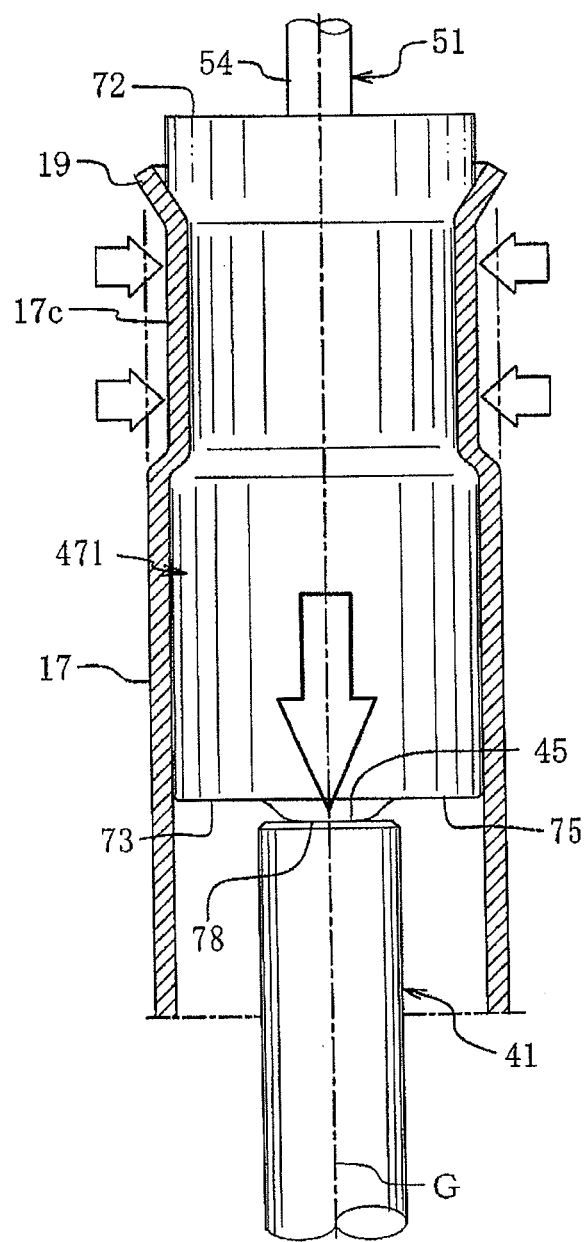
FIG. 12 is an enlarged central longitudinal sectional view showing essential portions of a temperature sensor according to yet another embodiment of the present invention, and a cross-sectional view thereof.

In the case where the rear end (rear end surface) 45 of the insulation sheath 41 is pressed frontward by means of a protrusion provided on the frontward-oriented surface of the seal member 371, according to the present embodiment, the recess 74 is provided at the front end 73 of the seal member 371, and the protrusion 78 is formed on the frontward-oriented surface 75 which is the bottom of the recess 74. The rear end 45 of the insulation sheath 41 is fitted into the recess 74 in a loose fit condition. By virtue of engagement through fitting, the effect of restraining lateral oscillation of the rear end 45 of the insulation sheath 41 is obtained. However, the protrusion 78 may be formed on the flat front end 73 of the seal member 371, the front end 73 serving as a frontward-oriented surface. FIG. 12 shows an example of this embodiment. The embodiment shown in FIG. 12 can be said to be an improved version of the modified embodiments shown in FIGS. 6 and 7.

Figure 7:
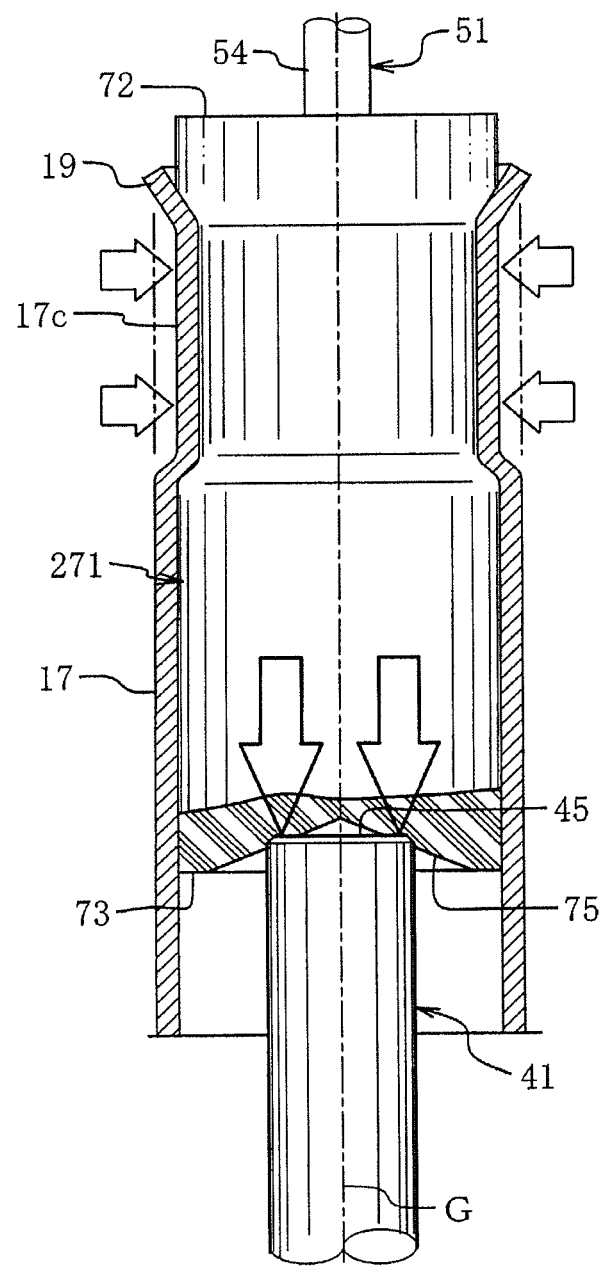
FIG. 7 is an enlarged partial sectional view showing essential portions of the sensor of FIG. 1 for explaining another modified embodiment of the seal member adapted to press the rear end of the insulation sheath in the sensor.

Similar to the modified embodiments shown in FIGS. 6 and 7, according to the present embodiment shown in FIG. 12, the front end 73 (the frontward-oriented surface 75) of a seal member 471 is formed larger than the rear end (rear end surface) 45 of the insulation sheath 41. Also, the outer circumferential edge of the rear end 45 of the insulation sheath 41 is located inside the outer circumferential edge of the frontward-oriented surface 75 of the seal member 471. In the present embodiment, the protrusion 78 projecting frontward is formed on the frontward-oriented surface 75 of the seal member 471 so that the protrusion 78 can press the rear end 45 of the insulation sheath 41 frontward at a portion located inside the outer circumferential edge of the rear end 45 of the insulation sheath 41. The protrusion 75 presses the rear end 45 of the insulation sheath 41 frontward. In the modified embodiments shown in FIGS. 6 and 7 in which the front end (frontward-oriented surface) of the seal member is flat, the rear end (rear end surface) 45 of the insulation sheath 41 causes depressed deformation of the front end (frontward-oriented surface) of the seal member which is in contact with the rear end 45 of the insulation sheath 41. Thus, if the outer circumferential edge of the rear end 45 of the insulation sheath 41 is in a knife-edge state, there is a problem in that a crack or a cut is apt to generate in the frontward-oriented surface of the seal member against which the rear end 45 is pressed. By contrast, by forming the protrusion 78 as shown in FIG. 12, the occurrence of such a problem is restrained or prevented.

The embodiment shown in FIGS. 9 to 12 has been described with respect to a semispherical protrusion. However, as described above, the shape and structure of the protrusion may be determined as appropriate. In view of action and effect of a protrusion (or a group of protrusions), preferably, the protrusion is formed and disposed so as to press the rear end (rear end surface) of the insulation sheath frontward at the center (at a central portion). The height (bulging height) of the protrusion may be determined according to elasticity, strength, etc., of the rubber in such a manner that, in a state in which the protrusion is pressed against the rear end of the insulation sheath; i.e., in a state in which the protrusion is compressed in the front-rear direction (deformed in a crushed manner), the protrusion sill has a certain bulge (height). That is, the size (diameter) and height of the protrusion may be determined so as to avoid a situation in which the outer circumferential edge (knife-edge) of the rear end of the insulation sheath compresses the frontward-oriented surface of the seal member and exerts a shearing action on the frontward-oriented surface. In the above description, the protrusion of the seal member directly presses the rear end of the insulation sheath frontward. However, even in the case where another member (e.g., a circular plate) intervenes therebetween, the protrusion may be designed to press the rear end of the insulation sheath via the another member.

The temperature sensor of the present invention is not limited to the above embodiments, but may be embodied in an appropriately modified form without departing from the gist of the invention. In the above embodiments, the tube has, in the rearward direction from the front end, the element accommodation portion having a small diameter, the insulation sheath accommodation portion, the mounting metal fitting attachment portion, and the seal member accommodation portion, and the diameters of these portions increase sequentially in the rearward direction. However, the tube is not limited to having such a dimensional relation. For example, the insulation sheath front end portion accommodation portion and the mounting metal fitting attachment portion may have the same diameter.

According to the present invention, in the temperature sensor in which the seal member is provided in a deformed manner by crimping the tube, by deforming the seal member, the seal member presses the rear end of the insulation sheath frontward, directly or via another member, by means of the frontward-oriented surface of the seal member, whereby the sensor element is pressed against the front end of the tube via the insulation sheath. However, the present invention is not limited thereto, but may be embodied in an appropriately modified form without departing from the gist of the invention. Use of the temperature sensor of the present invention is not limited to measurement of exhaust gas temperature, but the temperature sensor can be widely applied to other uses.

It should further be apparent to those skilled in the art that various changes in form and detail of the invention as shown and described above may be made. It is intended that such changes be included within the spirit and scope of the claims appended hereto.

This application claims priority from Japanese Patent Application No. 2010-162568 filed Jul. 20, 2010 and Japanese Patent Application No. 2011-92582 filed Apr. 19, 2011, the disclosures of which are incorporated herein by reference in their entirety.

What is claimed is:

1. A temperature sensor comprising:
a metal tube having a closed front end;
a temperature sensor element disposed in a front end portion of the tube;
an insulation sheath disposed rearward of the temperature sensor element within the tube and core wires connected to respective electrodes of the temperature sensor element, the core wires extending through the insulation sheath;
lead wires connected to respective rear ends of the core wires, the core wires extending outward from a rear end of the insulation sheath, and the lead wires extending outward from a rear end of the tube; and
an elastic seal member having rubber-like elasticity, the lead wires extending through the seal member, at least a portion of the seal member being disposed within the tube and rearward of the rear end of the insulation sheath for maintaining a seal at a rear end portion of the tube;

the seal member being deformed through crimping of the tube;

the temperature sensor being characterized in that, through deformation of the seal member, the seal member presses the rear end of the insulation sheath frontward, directly or via another member, by means of a frontward-oriented surface of the seal member, whereby the temperature sensor element is pressed against a front end of the tube via the insulation sheath.

2. The temperature sensor according to claim 1, wherein the seal member is provided in a rear end portion of the tube or in a portion of the tube located toward the rear end of the tube; and, by means of the rear end portion of the tube or the portion of the tube located toward the rear end of the tube being crimped in a radially compressed manner, the seal member is radially compressed, whereby the seal member is deformed such that the frontward-oriented surface is displaced frontward and presses the rear end of the insulation sheath frontward, directly or via another member.

3. The temperature sensor according to claim 1, wherein an insulation member is disposed between the temperature sensor element and a front end of the insulation sheath.

4. The temperature sensor according to claim 1, wherein the front end of the tube has an inner surface having a substantially semispherical concave shape, and the frontward-oriented surface of the temperature sensor element has a substantially semispherical convex shape which fits the substantially semispherical concave shape of the inner surface of the front end of the tube.

5. The temperature sensor according to claim 1, wherein the tube is formed such that an inner circumferential surface of a portion of the tube located toward the front end of the tube has a diameter accommodating at least a front end portion of the insulation sheath in a loose fit condition.

6. The temperature sensor according to claim 1, wherein the tube and the insulation sheath are disposed such that a filler for fixing the insulation sheath is not present between an inner circumferential surface of a portion of the tube located toward the front end of the tube and an outer circumferential surface of a portion of the insulation sheath located toward the front end of the insulation sheath.

7. The temperature sensor according to claim 1, wherein:
the seal member has a front end larger than the rear end of the insulation sheath;
an outer circumferential edge of the rear end of the insulation sheath is located inside an outer circumferential edge of the front end of the seal member;
a protrusion protruding frontward is formed on the frontward-oriented surface of the seal member, the protrusion pressing the rear end of the insulation sheath frontward at a portion located inside the outer circumferential edge of the rear end of the insulation sheath; and
the protrusion pressing the rear end of the insulation sheath frontward directly or via another member.

8. The temperature sensor according to claim 1, wherein:
the seal member has a recess foamed at a front end thereof;
the rear end of the insulation sheath is located within the recess;
a protrusion protruding frontward is formed on the frontward-oriented surface which is a bottom of the recess, the protrusion pressing the rear end of the insulation sheath frontward at a portion located inside an outer circumferential edge of the rear end of the insulation sheath; and
the protrusion pressing the rear end of the insulation sheath frontward directly or via another member.

9. The temperature sensor according to claim 7, wherein the protrusion has a substantially semispherical shape.

10. The temperature sensor according to claim 7, wherein the protrusion has a substantially semispherical shape formed over substantially the entirety of the frontward-oriented surface which is the bottom of the recess.

11. The temperature sensor according to claim 7, wherein:
the protrusion has a substantially semispherical shape formed over the entirety of the frontward-oriented surface which is the bottom of the recess, and
a concavely radiused fillet is formed at a corner located at the bottom of the recess and defined by a surface of the protrusion and a wall surface of the recess, along a circumferential direction of the wall surface.

\* \* \* \* \*